US006981311B2

(12) United States Patent
Seith et al.

(10) Patent No.: US 6,981,311 B2
(45) Date of Patent: Jan. 3, 2006

(54) FASTENING APPARATUS AND METHOD

(75) Inventors: Warren A. Seith, Bethlehem, PA (US); John A. McCallops, Easton, PA (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 10/383,016

(22) Filed: Mar. 6, 2003

(65) Prior Publication Data

US 2004/0172800 A1 Sep. 9, 2004

(51) Int. Cl.
*B23P 19/00* (2006.01)
*B23P 21/00* (2006.01)

(52) U.S. Cl. ............................ 29/707; 29/714; 29/798; 29/407.01; 29/407.07

(58) Field of Classification Search .......... 29/705–709, 29/714, 798, 821, 407.01, 407.02, 407.03, 29/407.07; 73/581; 173/168, 169, 1
See application file for complete search history.

(56) References Cited

U.S. PATENT DOCUMENTS 4,958,541 A * 9/1990 Annis et al. .................. 81/479
5,327,035 A 7/1994 Sunaga
5,478,164 A 12/1995 Mori
D372,457 S 8/1996 Okuyama et al.
5,684,287 A 11/1997 Walts
5,725,533 A * 3/1998 Carlsson ..................... 606/101
5,798,588 A 8/1998 Okuyama et al.
5,889,349 A 3/1999 Yasuda
5,936,516 A 8/1999 Narea et al.
5,949,333 A * 9/1999 Lehmann et al. ........... 340/571
5,952,745 A 9/1999 Yasuda
6,060,816 A 5/2000 Audren
6,211,775 B1 4/2001 Lee et al.
2002/0182564 A1 * 12/2002 Katsuda et al. ............... 433/98
2003/0094081 A1 * 5/2003 Becker et al. ................ 81/479

* cited by examiner

*Primary Examiner*—Marc Jimenez
(74) *Attorney, Agent, or Firm*—Michael Best & Friedrich LLP

(57) ABSTRACT

A system and method for precision fastening of a fastener. The fastening system includes a motor and a sensor that provides a feedback signal from the motor to a controller. The controller compares the feedback signal to a threshold value to determine if an error condition exists. If the error condition exists, the controller oscillates a rotor to the motor between a first and a second position. In one construction, a resolver provides a signal to the controller representing a position of the oscillating rotor. The oscillating rotor vibrates the housing, thereby alerting an operator of the error condition. In one construction, the fastener device can alert the operator that the fastener is not tightened to a proper torque, and that the fastener is not rotated through a proper angle of rotation.

12 Claims, 3 Drawing Sheets

FASTENING APPARATUS AND METHOD

FIELD OF THE INVENTION

The present invention relates to a fastening system. In particular, the present invention relates to a feedback control for a fastening system.

BACKGROUND OF THE INVENTION

A typical fastening system includes a motor that drives an output element to rotate a threaded fastener onto a threaded connecting element. Proper connection of the fastener requires exertion of torque on the fastener and proper alignment of the threads.

SUMMARY OF THE INVENTION

Operators desire a fastening system that indicates when inadequate tightening of the fastener and/or improper alignment of the threaded fastener occurs. Indication lights and/or audio alarms can be difficult to recognize in a fast-paced and noisy industrial environment.

In one construction, the invention provides a fastening system that includes a housing defining a chamber, a motor positioned within the chamber and having a rotor, a sensor, and a controller. The sensor is coupled to the rotor and provides a feedback signal of a motor operation. The controller receives the feedback signal, determines an error condition based upon the feedback signal, and oscillates the rotor between a first position and a second position to vibrate the housing in response to the error condition. The vibrating housing provides an indication to the user that the fastener was improperly installed. In one construction, the sensor is a torque transducer and the feedback signal represents a torque force exerted by the motor. In a second construction, the sensor provides a feedback signal that represents a revolution of the rotor.

In another construction, the invention provides a method for indicating an error condition of a fastening system that includes detecting a feedback signal from a motor of the fastener system, comparing the feedback signal to a threshold value, determining an error condition based upon the feedback signal, and oscillating a rotor to the motor between a first position and a second position to vibrate a housing to the motor in response to the error condition.

As is apparent from the above, it is an aspect of the invention to provide a system and method for providing precision fastening of a fastener. Other features and aspects of the invention will become apparent by consideration of the detailed description and accompanying drawings.

DETAILED DESCRIPTION

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
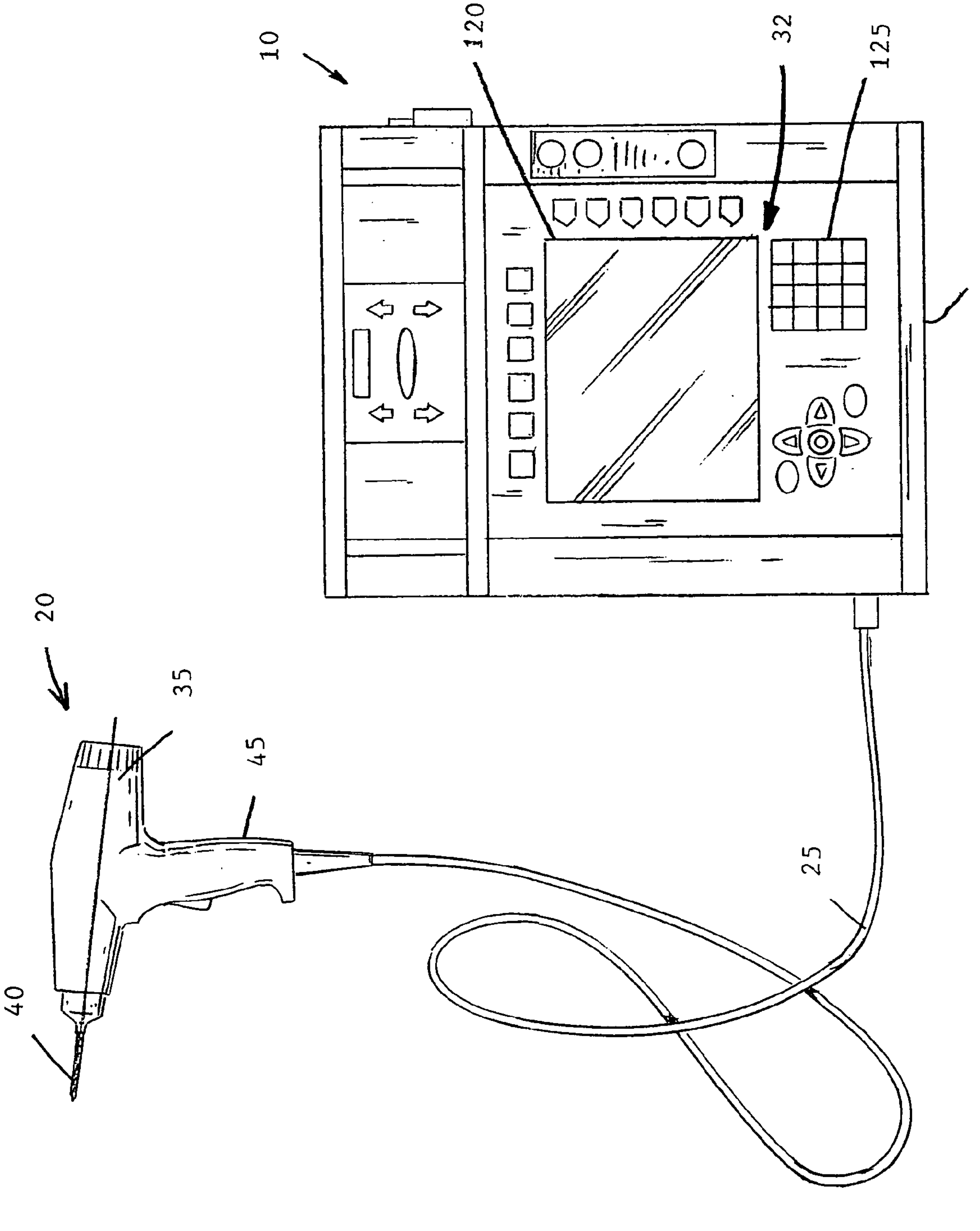
FIG. 1 is a perspective view of a fastening system of the invention including a control console.

FIG. 1 is a perspective view of a construction of a fastening system 10 according to the present invention for fastening/unfastening a fastener. In one construction of the invention, the fastening system 10 includes a fastening device or tool 20 electrically connected by a communication bus 25 to a control console 27. The control console 27 includes a controller 30 (See FIGS. 2 and 3) and an interface 32. In another construction, the fastening tool 20 can be a portable tool in wireless communication (e.g., via a rf signal, etc.) with the control console 27. In yet another construction, the fastening tool 20 can be a portable tool having a portable controller 30. The fastener or fastener component (not shown) can be any connector rod, bolt, nut, screw, etc. known those in the art that is operable in fastening an assembly and is not limiting on the invention.

An exemplary control console 27 having the controller 30 and the user interface 32 is the INSIGHT™ Model PFS manufactured by the INGERSOLL-RAND™ Company. However, the fastening system 10 of the invention can work with other motor controllers and/or user interfaces known in the art and is not limiting on the invention.

One construction of the communication bus 25, as shown in FIG. 1, includes a power line and a communication line. The power line allows the controller 30 (See FIGS. 2 and 3) at the control console 27 to enable/disable the fastening tool 20. The communication line allows communication to and from the controller 30 with the fastening tool 20, including control information related to operation of the fastening tool 20 and command signals from the controller 30.

The fastening tool 20 provides the torque for driving a fastener. As shown in FIG. 1, one construction of the fastening tool 20 includes a motor 35 (not shown) that drives an output spindle 40. In general, the motor 35 provides the torque to the output spindle 40 to fasten/unfasten a fastener to an assembly. The exemplary construction of the fastening tool 20 as shown in FIG. 1 is a Model DEP15NS4TL manufactured by the INGERSOLL-RAND™ Company. Of course, the fastening tool 20 can be any electrically driven tool (angle tool, in-line tool, hand-held tool, etc.) known to those skilled in the art for fastening/unfastening a fastener or fastener component (not shown). The fastening tool 20 also includes a housing 45 that forms a chamber to enclose or retain the motor 35. The housing 45 can be any suitable size and shape and made from any suitable material (e.g., metal, plastic, etc.) known in the art of fastening systems.

Figure 2:
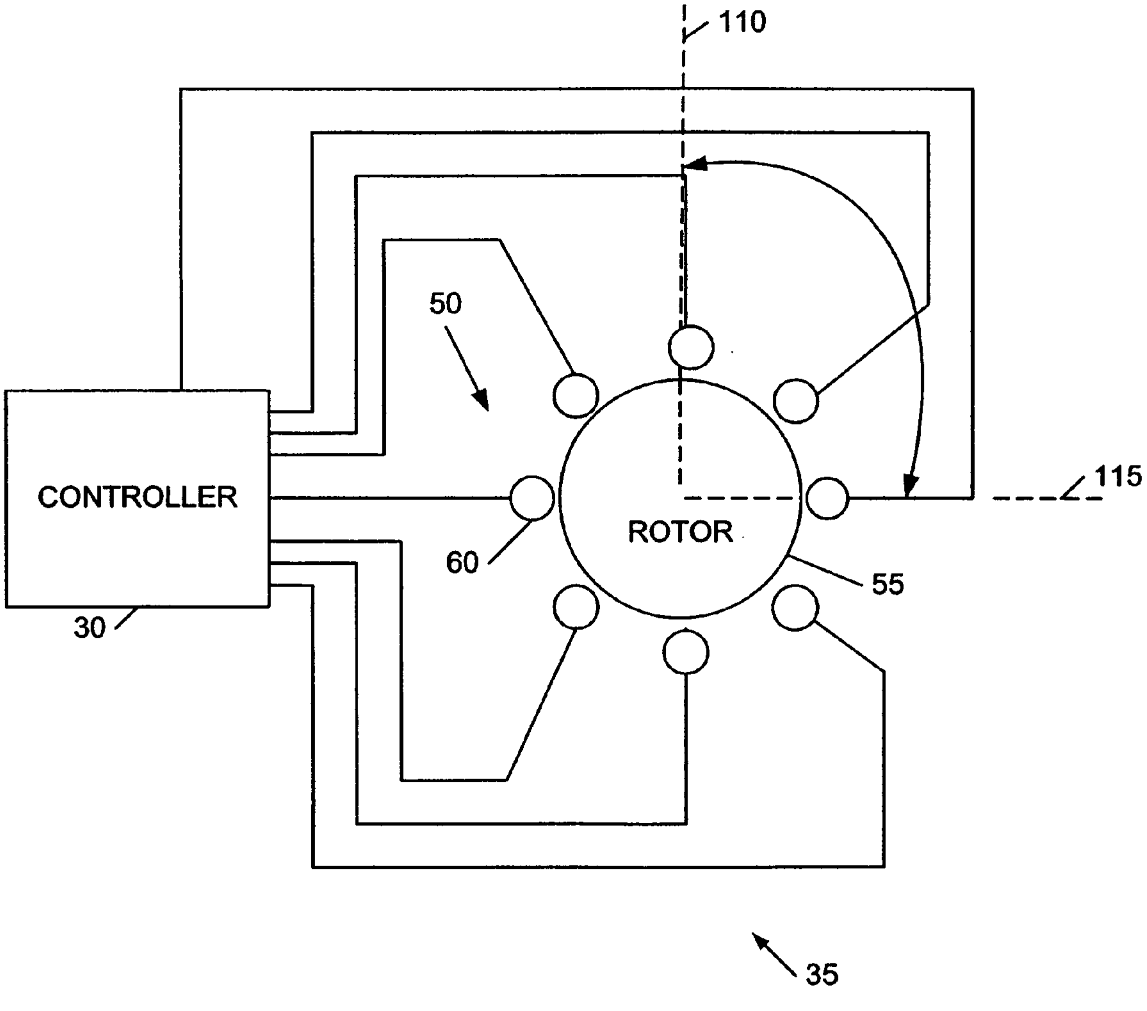
FIG. 2 is a schematic view of the control system of FIG. 1.

FIG. 2 shows a schematic diagram of the controller 30 in communication with the motor 35. As shown in FIG. 2, in one construction, the motor 35 is a direct current (DC) brushless motor having a stator 50 and a rotor 55. The stator 50 includes a plurality of stator windings 60 located at a radial distance from the rotor 55. The rotor 55 includes a plurality of permanent magnets (not shown) located along a periphery of the rotor 55. When electrically energized, the windings 60 generate a magnetic field. The magnetic interaction between the magnetic field from the windings 60 and the permanent magnets induces rotation of the rotor 55. The controller 30 provides a control signal that regulates the excitation of the respective windings 60 of the stator 50. The excitation of the stator windings 60 controls the position and rotational speed of the rotor 55.

Figure 3:
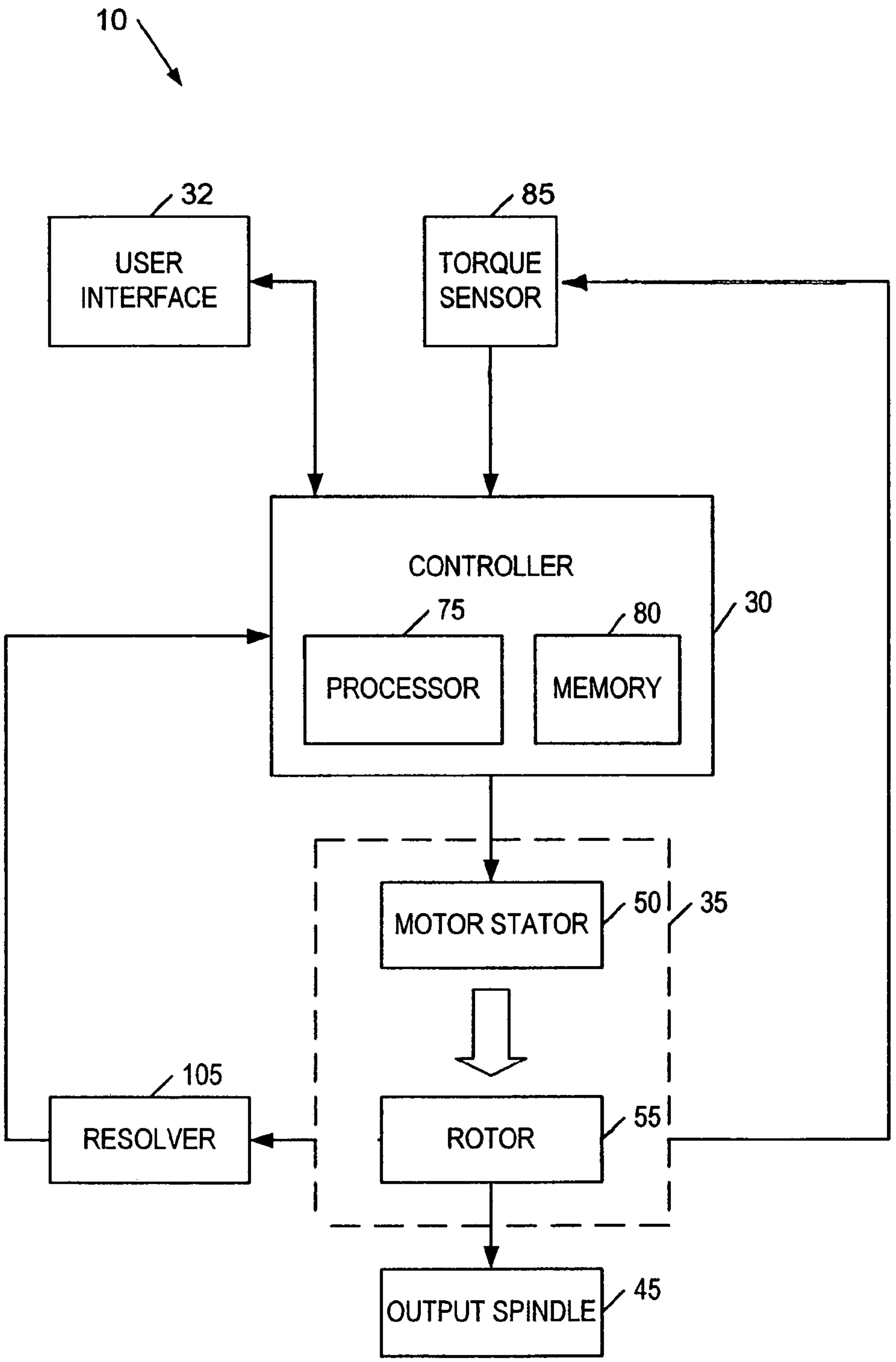
FIG. 3 is a schematic view of the fastening system of FIG. 1.

FIG. 3 is a schematic diagram of the fastening system 10 of the invention. One construction of the fastening system 10 includes the controller 30 electrically connected to the stator 50 of the motor 35, a sensor, and the user interface 32. The controller 30 includes a processor 75 and a memory 80. The processor 75 obtains, interprets, and executes a plurality of software program instructions stored in the memory 80. In addition to software instructions, the memory 80 provides storage for pre-programmed control parameters, manually input parameters, and a history of measured parameter information from operation of the fastener tool 20. Additionally, the controller 30 can include other circuitry or components (e.g., signal conditioners, filters, drivers, analog-to-digital converters, amplifiers, etc.) not shown but that would be apparent to one skilled in the art.

Among its functions, the processor 75 is configured by the software to receive signals or input from sensors/transducers, to analyze the received signals and input, and to generate command signals to the stator 50 of the fastening tool 20. In one construction, the processor 75 is a microprocessor operable in executing a plurality of instructions. An example microprocessor is an Intel Pentium processor of a personal computer. However, other processors (e.g., programmable logic controllers, etc.) known to those skilled in the art can be used.

In one construction, the controller 30 includes a servo-drive control device to control operation of the motor 35. In general, the servo-drive control device receives feedback information from sensors/transducers at the motor 35, processes the feedback information, and adjusts the control signal to the stator 50 in response to the feedback information. Of course, other types of controllers known to those skilled in the art can be used.

Referring to FIGS. 1 and 3, a sensor/transducer located at the motor 35 provides feedback signals via the communication bus 25 to the controller 30. The feedback signal includes control information or parameters detected at the motor 35. As shown in FIG. 3, one construction of a sensor/transducer includes a torque transducer 85 to provide a feedback signal that represents a value of the torque force exerted by the motor 35. The controller 30 includes a converter that translates the feedback signal into a torque value. The controller 30 can also include a comparator that determines if the torque value is outside a predetermined threshold range stored in the memory 80 of the controller 30. In another construction, the torque transducer 85 may include the comparator that enables the transducer 85 to provide a feedback signal if the exerted torque is below a threshold value. A high torque value is indicative that the fastener component is too tight. A low torque value is indicative of an error condition that the operator did not adequately tighten the fastener component with the fastening tool 20. In another embodiment, the sensor can provide signals representative of values of other parameters (e.g., heat, slippage, etc.) of interest in the fastening process.

Referring to FIG. 3, another construction of a sensor/transducer is a resolver 105 to provide a feedback signal to determine the angular rotation traveled by the rotor 55. The resolver 105 is positioned in the vicinity of the rotor 55 and stator 50. The resolver 105 converts the angular position of the rotor 55 relative to the stator 50 into an analog or digital signal. In general, as the stator 50 induces the rotor 55 to rotate, the resolver 105 generates voltage waveforms (e.g., sine and cosine waveforms) of different magnitude depending on the position of the rotor 55 relative to the stator. The resolver 105 translates the voltage waveforms into a feedback signal indicative of the rotor 55 position. One construction of the resolver 105 provides this feedback signal via the communication bus 25 to the controller 30.

The controller 30 translates the signal provided by the resolver 105 into an angular rotation turned by the rotor 55 and/or interconnected output spindle 40 in driving the fastener. The controller 30 can include a comparator that determines if the measured value for the angular rotation of the rotor 55 and/or spindle 40 is outside a threshold range stored in the memory 80 of the controller 30. Using a factor associated with a gear ratio of the motor 35, the controller 30 can convert the angle of rotation or number of revolutions turned by the rotor 55 into an angle of rotation traveled by the output spindle 40. An angular rotation of the rotor 55 and/or spindle 40 outside the threshold range can indicate that a threaded fastener was installed with the threads out of alignment, and/or the fastener is improperly tightened. The controller 30 can also use the feedback signal from the resolver 105 to regulate the speed and/or position of the rotor 55, as described later.

In another construction of the invention, the resolver 105 can include a comparator that enables the resolver 105 to signal the controller 30 if the rotational angle traveled by the rotor 55 is outside a predetermined threshold range. In yet another construction of the invention, one or more Hall effect sensors can be used to provide a feedback signal to the controller 30 indicative of the rotor 55 position.

The controller 30 can also determine an error condition using various combinations of torque information and angle of rotation information, etc. provided by the various sensors/transducers located at the motor 35. For example, the controller 30 can monitor a yield of the fastening operation based upon the slope of the measured torque versus angle of rotation. In another example, the controller 30 can monitor the angle of rotation information or the number of revolutions once the controller 30 detects a threshold torque force.

As noted above, the controller 30 includes a memory 80 for storage of control feedback information from the sensors/transducers described above. In one construction, the controller 30 sets the predetermined threshold ranges for an error condition (e.g., torque, angle of rotation, number of revolutions, etc.) based upon the feedback information from the sensors/transducers. In one construction, the threshold range for an error condition can be determined from the most recent twenty-five measured samples of fastening parameters collected from fastening operations. In another construction, the threshold range for an error condition can be determined from the first twenty-five measured samples of fastening parameters collected from fastening operations. Of course, the selection or number of samples can vary and is not limiting on the invention. In yet another construction, the controller 30 can use different threshold ranges for detecting an error condition for different stages of fastening operations (e.g., start, end, etc.).

Upon detecting an error condition, the controller 30 provides an alarm indication to the operator. As described above, the controller 30 can detect error conditions based upon the torque and angle of rotation feedback from the torque transucer 85 and/or resolver 105 at the motor 35. The controller 30 alerts the operator of the error condition by vibrating the housing 45. To vibrate the housing 45 (FIG. 1), the controller 30 oscillates the rotor 55 of the motor 35 (FIG. 2). The oscillating motor causes vibration of the housing 45 in the hand of the operator, indicating an error condition in the fastening operation of the fastener. In one construction and as shown in FIG. 2, the controller 30 oscillates the rotor 55 between a first 110 position and a second 115 position. To oscillate the rotor 55, the controller 30 can use feedback information from the resolver 105 representative of the rotor 55 position with respect to the stator 50. In response to feedback information of the rotor 55 position, the controller 30 adjusts the control signal that regulates the electrical excitation of the pairs of stator windings 60 (FIG. 2). The electrical excitation of the stator windings 60 controls the rotation of the rotor 55 between the first position 110 and the second position 115 and back, thereby vibrating the housing 45. As shown in FIG. 2, the first and second positions of the rotor 55 are ninety degrees apart. Of course, the first and second positions 110, 115 of the rotor 55 can vary depending on the desired vibration of the housing. In addition, the controller 30 can set the frequency or speed of oscillation of the rotor 55. In one construction, the controller 30 sets the frequency of the oscillation to 10 hertz. Of course, the frequency can vary and is not limiting on the invention.

As shown in FIGS. 1 and 3, the user interface 32 allows an operator to view and to manually input control information (e.g., measured torque and angle of rotation, threshold torque and angle of rotation ranges, etc.) related to the operation of the fastening tool 20. As shown in FIG. 1, one construction of the user interface 32 includes a visual display 120 (e.g., light-emitting diodes, liquid crystal display, monitor, etc.) and a keyboard 125. In addition, the user interface 32 can further include audio indicators (e.g., buzzers, speakers, etc.) known in the art. The user interface 32 can provide visual and/or audio indications in combination with vibrating the housing 45 to alert the operator of the error condition. Regarding the error or alarm condition, the user interface 32 can indicate the location of the fastening tool 20 in error, and a description of the alarm condition (e.g., threshold value, measured value, past error conditions, etc.). One construction of the interface 32 is located at the control console 27 and/or at a remote control center. The controller 30 and user interface 32 can be used to control and monitor one or more fastening tools 20. In another construction, the controller 30 can include a modem, common interface gateway, and web browser to allow communication between the controller 30 and a remote workstation via an intranet or internet communication line.

Having described the basic architecture of the fastening system 10, the operation of the fastening system 10 will now be described.

In operation, the operator or user activates the fastening system 10 of the invention. Upon activation, the controller 30 uploads stored threshold ranges for torque, angle of rotation, number of revolutions, etc. respective to the sensors and transducers of the fastening tool 20. The values of the threshold ranges can depend upon the particular fastening tool 20, output spindle 40, and fastener being used. This information can be entered by manual computer entry or scanned by an infrared scanner. In one construction, the controller 30 is connected to a fastening tool 20 having a type of output spindle 40 to drive a fastener. In another construction, the controller 30 can be used to simultaneously control more than one fastening tool 20 having a plurality of output spindles for driving various types of fasteners. Upon selecting the type of control for the respective fastening operation, the operator engages the fastening tool 20 to install the fastener to the assembly. The torque transducer 85 and resolver 105 at the motor 35 provide feedback information to the controller 30. Using the threshold values, the controller 30 determines from the feedback information whether the fastener has been properly installed. If the controller 30 determines from the measured control information that an error condition exists (e.g., sub-threshold torque, inadequate rotation of rotor, excessive torque, excessive rotation of rotor, etc.), the controller 30 causes the rotor 55 of the motor 35 to oscillate between the first 110 and the second 115 position. In controlling the oscillation of the rotor 55, the controller 30 uses the feedback information of the rotor position provided by the resolver 105. Based upon the feedback information of the rotor position, the controller 30 provides the control signal that energizes the plurality of stator windings 60 to cause the rotor 55 to oscillate. The oscillation of the rotor 55 causes the housing 45 to vibrate. The vibrating housing 45 provides a tactile indication to the operator that an error condition exists. In one construction, the controller 30 can vibrate the housing 45 at the same frequency to signify an error condition. In another construction, the controller 30 can vibrate the housing 45 at a different frequency depending upon the type of error condition (e.g., torque, angle, etc.). The controller 30 can also provide other indications of the error condition via other visual and/or audio indicators at the user interface 32.

In another construction, an operator can elect to drive the fastener, then backout or reverse the fastener before driving the fastener again. An operator can elect this method of fastening based upon the type of fastener or to correct an error condition. The controller 30 can monitor torque, angle, etc. of the fastener tool 20 during both forward and reverse modes of operation. For example, to correct an error condition, the operator can elect to reverse the fastening operation, called fault backout. In one construction of the invention, the controller 30 can automatically deactivate the error detecting sensors (e.g., torque, angle of rotation, number of revolutions, etc.) and indicators (e.g., vibrating the housing 45) when the operator selects to fault backout the fastener. Upon retrying or driving forward the fastener, the controller 30 can automatically re-activate the error condition detecting sensors and indicators. In another construction, the controller 30 can monitor for an error condition during both forward and reverse modes of operation.

Thus, the invention provides, among other things, a feedback control for a fastening system. Various features and advantages of the invention are set forth in the following claims.

What is claimed is:

1. A fastening system for driving a fastener in a workpiece, comprising:

a housing defining a chamber;

a motor positioned within the chamber and having a rotor, the rotor being connectable to the fastener and being operable to drive the fastener in the workpiece;

a sensor coupled to the rotor to provide a feedback signal representative of a motor operation; and a controller to receive the feedback signal, to determine a fastener condition based upon the feedback signal, and to oscillate the rotor between a first position and a second position to vibrate the housing when the fastener condition is different than a predetermined fastener condition.

2. The fastening system of claim 1, wherein the controller provides a control signal to a stator to induce the rotor to oscillate.

3. The fastening system of claim 1, wherein the sensor is a torque sensor and the feedback signal represents a torque force exerted by the motor.

4. The fastening system of claim 1, wherein the sensor is a resolver and the feedback signal represents a position of the rotor with respect to a reference.

5. The fastening system of claim 1, wherein a communication bus links the controller to the sensor.

6. The fastening system of claim 1, wherein the motor includes a stator at least partially surrounding the rotor, and further comprising a second sensor to detect a position of the rotor with respect to the stator.

7. The fastening system of claim 6, wherein the second sensor is a resolver.

8. The fastening system of claim 7, wherein the resolver provides a first feedback signal to the controller when the rotor reaches the first position and a second feedback signal to the controller when the rotor reaches the second position.

9. The fastening system of claim 1, wherein the first position of the rotor and the second position of the rotor are ninety degrees apart.

10. The fastening system of claim 1, further comprising a user interface operable to receive an input from an operator that includes the first and second positions and a speed to oscillate the rotor.

11. The fastening system of claim 1, wherein the motor is a direct current, brushless motor.

12. The fastening system of claim 1, wherein the rotor oscillates between the first and second positions at a frequency of ten hertz.

* * * * *